United States Patent
Rhoads et al.

(10) Patent No.: US 11,060,998 B2
(45) Date of Patent: Jul. 13, 2021

(54) NONLINEAR MASS SENSORS BASED ON ELECTRONIC FEEDBACK

(71) Applicant: Purdue Research Foundation, West Lafayette, IN (US)

(72) Inventors: Jeffrey Frederick Rhoads, West Lafayette, IN (US); George Tsu-Chih Chiu, West Lafayette, IN (US); Nikhil Bajaj, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 237 days.

(21) Appl. No.: 16/333,273

(22) PCT Filed: Dec. 4, 2018

(86) PCT No.: PCT/US2018/063855
§ 371 (c)(1),
(2) Date: Mar. 14, 2019

(87) PCT Pub. No.: WO2019/118233
PCT Pub. Date: Jun. 20, 2019

(65) Prior Publication Data
US 2020/0064310 A1   Feb. 27, 2020

Related U.S. Application Data

(60) Provisional application No. 62/629,386, filed on Feb. 12, 2018, provisional application No. 62/598,429, (Continued)

(51) Int. Cl.
*G01N 29/12*   (2006.01)
*G01N 29/036*  (2006.01)

(52) U.S. Cl.
CPC ........... *G01N 29/12* (2013.01); *G01N 29/036* (2013.01); *G01N 2291/014* (2013.01); *G01N 2291/0255* (2013.01); *G01N 2291/02491* (2013.01)

(58) Field of Classification Search
CPC ...... H03B 5/326; G01H 13/00; G01N 29/036; G01N 29/12; G01N 29/022; G01N 29/36; (Continued)

(56) References Cited

U.S. PATENT DOCUMENTS 4,070,638 A * 1/1978 Reeder .................. G06G 7/195
                                                 333/150
5,379,346 A * 1/1995 Pecora .................. G06F 17/10
                                                 331/78

(Continued)

OTHER PUBLICATIONS

Kumar et al, Modeling, Analysis, and Experimental Validation of a Bifurcation-Based Microsensor, Journal of Microelectromechanical Systems, vol. 21, No. 3, Jun. 2012 (Year: 2012).*

(Continued)

*Primary Examiner* — David L Singer
(74) *Attorney, Agent, or Firm* — Purdue Research Foundation; Zhigang Rao

(57) ABSTRACT

This present disclosure relates to sensors capable of sensing mass, stiffness, and chemical or biological substances. More specifically, this disclosure provides the design and implementation of a piecewise-linear resonator realized via diode- and integrated circuit-based feedback electronics and a quartz crystal resonator. The proposed system is fabricated and characterized, and the creation and selective placement of the bifurcation points of the overall electromechanical system is demonstrated by tuning the circuit gains. The demonstrated circuit operates around at least 1 MHz.

4 Claims, 11 Drawing Sheets

Related U.S. Application Data filed on Dec. 13, 2017, provisional application No. 62/597,976, filed on Dec. 13, 2017.

(58) Field of Classification Search
CPC ... G01N 2291/0255; G01N 2291/0256; G01N 2291/014; G01N 2291/02491; G01N 5/02
See application file for complete search history.

(56) References Cited

U.S. PATENT DOCUMENTS

| | | | | |
|---|---|---|---|---|
| 5,442,510 | A * | 8/1995 | Schwartz | G05B 5/01 700/32 |
| 5,473,694 | A * | 12/1995 | Carroll | H04L 27/001 375/364 |
| 5,655,022 | A * | 8/1997 | Carroll | H04L 7/027 380/263 |
| 6,127,899 | A * | 10/2000 | Silva | H03B 29/00 331/117 FE |
| 6,472,945 | B1 * | 10/2002 | Gumm | H03B 5/24 331/138 |
| 2005/0281061 | A1 * | 12/2005 | Radecker | H02M 3/28 363/21.02 |
| 2013/0047710 | A1 * | 2/2013 | Rhoads | G01N 29/036 73/64.53 |
| 2016/0290855 | A1 * | 10/2016 | Rhoads | G01H 13/00 |
| 2019/0383715 | A1 * | 12/2019 | Bouchaala | G01N 29/036 |

OTHER PUBLICATIONS

Kumar et al, Bifurcation-based mass sensing using piezoelectrically-actuated microcantilevers, Appl. Phys. Lett. 98, 153510 (Year: 2011).*

Okazaki et al, Chaotic and Bifurcation Behavior in an Autonomous Flip-Flop Circuit Used by Piecewise Linear Tunnel Diodes, 1998 IEEE International Symposium on Circuits and Systems (ISCAS) (Year: 1998).*

Bajaj et al, Design and Implementation of a Tunable, Duffing-Like Electronic Resonator via Nonlinear Feedback, Journal of Microelectromechanical Systems, vol. 25, No. 1, Feb. 2016 (Year: 2016).*

Analog Devices, AD633 Data Sheet (Year: 2015).*

Texas Instruments, LM7321, Revised Sep. 2015 (Year: 2020).*

Texas Instruments, OPAx192, Revised Nov. 2015 (Year: 2020).*

Texas Instruments, THS4601, Revised Jun. 2002 (Year: 2020).*

Patimisco et al, Quartz-enhanced photoacoustic spectrophones exploiting custom tuning forks: a review, Advances in Physics: X, 2016 vol. 2, No. 1, 169-187 (Year: 2016).*

MSTECH Advanced Sensor Technologies, Tuning Fork Sensors (Year: 2016).*

International Search Report and Written Opinion of the International Search Authority, dated Feb. 6, 2019.

* cited by examiner

NONLINEAR MASS SENSORS BASED ON ELECTRONIC FEEDBACK

CROSS-REFERENCE TO RELATED APPLICATION

This application claims priority to, and is a 35 U.S.C. § 371 national stage application of International Patent Application Serial No. PCT/US18/63855, filed on Dec. 4, 2018, which is related to and claims the benefits of U.S. Provisional Applications Ser. Nos. 62/597,976, 62/598,429, and 62/629,386, filed Dec. 13, 2017, Dec. 13, 2017, and Feb. 12, 2018, respectively. The contents of which are incorporated herein entirely.

STATEMENT REGARDING GOVERNMENT FUNDING

This invention was made with government support under 2013-ST-061-ED0001 awarded by the U.S. Department of Homeland Security. The government has certain rights in the invention.

TECHNICAL FIELD

The present disclosure relates to novel nonlinear sensors capable of sensing the mass of materials such as chemical or biological substances.

BACKGROUND

This section introduces aspects that may help facilitate a better understanding of the disclosure. Accordingly, these statements are to be read in this light and are not to be understood as admissions about what is or is not prior art.

To date, the success of microelectromechanical systems (MEMS) devices can be seen in their widespread adoption across many industries and use as accelerometers, gyroscopes, microphones, and sensors. The importance of these systems stem from their potential to provide low-cost, scalable, and sensitive transducer alternatives based upon a wide variety of modalities.

Resonant mode sensing is common in MEMS devices and is founded on correlating changes in the resonant behavior of structures and devices to identifiable parameter changes. Within the realm of mass sensing, traditional methods rely on linear or pseudo-linear sensing techniques, which, in turn, rely on the measurement of shifts in the resonant frequencies of a device to detect changes in the device or environmental parameters. These methods have been successfully used to detect a number of chemical species and other small masses (picograms and smaller in many cases) and have also found use in applications such as atomic force microscopy (AFM). Performing sensing tasks in linear resonant modes of operation with high sensitivity requires careful system design and may incur significant cost or complexity to implement. For example, it may require phase-locked loops, lock-in amplifiers, or other specialized equipment to perform the measurements and yield the high sensitivity in frequency shift measurement required for modern applications.

Some alternative approaches to linear resonant mode sensing involve using nonlinear phenomena. In bifurcation-based sensing, nonlinear behavior can be used to produce large changes in amplitude response when a mass change threshold is exceeded. Resonator devices capable of operating in a nonlinear regime commonly exhibit Duffing-like frequency responses. These devices exhibit multiple co-existing steady-state solutions (stable and unstable), saddle-node bifurcations, and hysteretic behavior. This behavior stems from the specific physical design of the system, where driving the device beyond its standard operating region can result in the nonlinear behavior becoming significant. Unfortunately, higher drive amplitudes require higher power circuitry, reducing applicability for battery-powered, low power, mobile sensing. It is possible to compensate for this by redesigning devices specifically for bifurcation-based sensing, but this may not be practical for all applications.

A promising approach for addressing the issue of excessive drive requirements is to use feedback to produce bifurcation behavior at low drive amplitudes without risking the device's reliability and lifespan. Bajaj, et al. previously demonstrated a collocated sensing and actuation Duffing-like resonator using cubic feedback for the purpose of bifurcation-based sensing using quartz tuning forks, which operated at 32.7 kHz. See Bajaj et al., Design and Implementation of a Tunable, Duffing-Like Electronic Resonator via Nonlinear Feedback, Journal of Microelectromechanical Systems, 25 (1), 2016, 2-10. In order to implement cubic feedback at 32.7 kHz with minimal phase delay, Bajaj, et al. implemented an analog multiplier-based design. The demonstrated circuit is not applicable for resonators with resonant frequency above approximately 200 kHz due to the bandwidth of the selected multiplier integrated circuit (IC). This is a critical limitation, as many candidate resonators that have higher sensitivity performance than the tuning forks (for example, the quartz resonators often used in quartz crystal microbalance systems) operate in high frequency range (10's of MHz or higher).

Therefore, there is still a need for novel nonlinear sensing devices that can operate at a frequency of at least 1 MHz or higher.

SUMMARY

The present disclosure relates to novel nonlinear sensors capable of sensing the mass of materials such as chemical or biological substances.

In one embodiment, the present disclosure provides a piecewise-linear resonator system, wherein the piecewise-linear resonator system comprises at least one pair of parallel reversed diodes and at least one resistor as a diode feedback subsystem, wherein the piecewise-linear resonator system is capable of generating a saddle-node-like bifurcation behavior with a frequency of at least 1 MHz.

In one embodiment, the present disclosure provides a sensing device comprising:

a linear response sensor comprising a functional surface layer capable of interacting with a material to be sensed, and an output capable of producing a linear signal according to the material that is sensed by the linear response sensor;

a sensing and actuation subsystem comprising a non-inverting summing amplifier, a transimpedance amplifier, and a resonator with a resonant frequency of at least 1 MHz, wherein the sensing and actuation subsystem has an input coupled to the output of the linear response sensor, wherein the input is configured to receive the linear signal produced by the linear response sensor; and a diode feedback subsystem comprising at least one pair of parallel reversed diodes and at least one resistor or a device that has resistor function, wherein the diode feedback subsystem is capable of generating a piecewise-linear approximation circuit, wherein the sensing device is capable of generating saddle-node-like bifurcation behavior with a frequency of at least 1 MHz.

In one embodiment, the present disclosure provides a sensing device, wherein the sensing device comprises:

a linear response sensor comprising a functional surface layer located to interact with a material to be sensed, and an output that produces a first linear signal responsive to one or more of mass, inertia, stiffness, acceleration, pressure, radiation, chemical compounds, or biological compounds; and an electronics comprising an input coupled to said output of the linear response sensor to receive said first linear signal produced from said output; and a non-linearity feedback subsystem that applies one or more non-linear electrical operations to said first linear signal received at said input from said output to generate a non-linear second signal, wherein said one or more non-linear electrical operations are capable of generating bifurcation in the non-linear second signal when said one or more non-linear electrical operations are applied to the first linear signal received at said input, wherein said non-linearity feedback subsystem comprises one pair of parallel reversed diodes and one resistor as a diode feedback subsystem.

BRIEF DESCRIPTION OF DRAWINGS

(FIG. 13A) Magnitude plot. (FIG. 13B) Phase plot. Open circles denote increasing frequency stepped sine test, and small filled circles denote results for decreasing frequency test.

DETAILED DESCRIPTION

For the purposes of promoting an understanding of the principles of the present disclosure, reference will now be made to the embodiments. It will nevertheless be understood that no limitation of the scope of this disclosure is thereby intended.

Increasing the functional operating frequency (KHz range) of a non-linear feedback system capable of producing bifurcation behavior as previously disclosed into the 10's MHz range requires the consideration of a number of factors. One of the most important factors is time delay. The impact of the time delay becomes more relevant as frequency increases.

Figure 1:
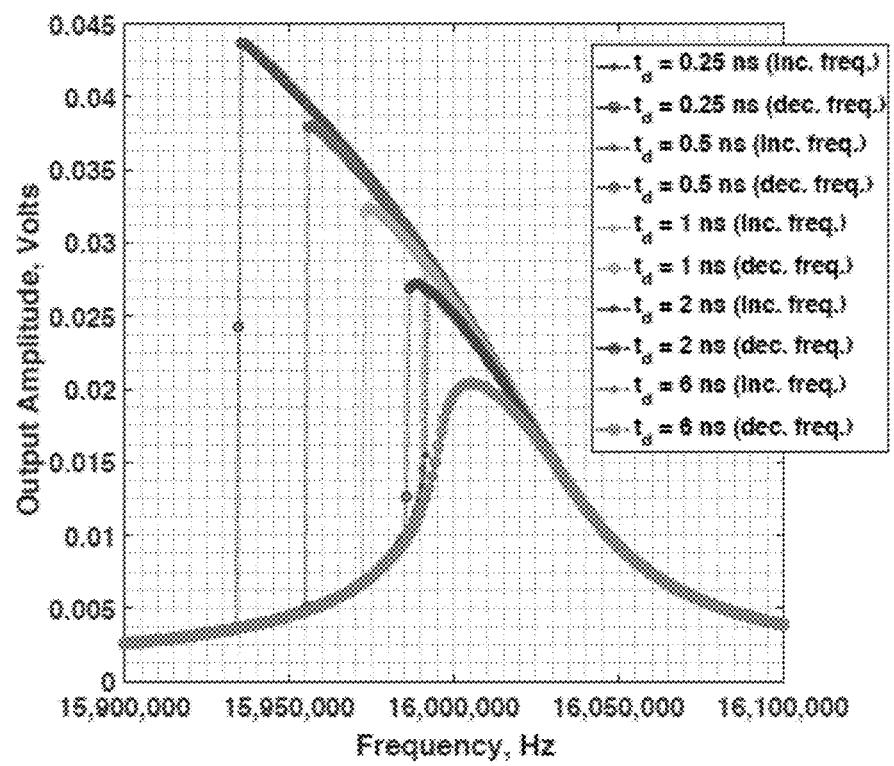
FIG. 1 shows the simulated effect of increasing time delay on the swept sine response of a Kyocera CX3225 resonator with a nonlinearity consisting of a time delayed cubic feedback. The CX3225 resonator simulated has parameters of those in Table 1 with an ideal cubic function between input and output gains, scaled to produce the bifurcation behavior indicated here.

In FIG. 1, the simulation results indicate that the desirable attributes of the Duffing resonator frequency response (namely, the bifurcation-associated jump behavior) are mitigated and finally removed by increasing the time delay in the feedback term. Therefore, in the design of such resonating systems, the feedback time delay is a critical parameter, and either needs to be accounted for through additional design elements, or minimized.

The present disclosure addresses the challenges in loop time delay by evaluating and implementing a diode-based circuit architecture that reduces time-delay and also still produces a saddle-node bifurcation. The circuit and platform motivation, design, and implementation are elaborated upon, and experimental results for a feedback-enabled softening bifurcation circuit are demonstrated. Analytical modeling results are presented based on an ideal diode and piecewise-linear stiffness resonator model. The implemented system is capable of operation at 16 MHz, enabling the use of resonators with operational frequencies in the 10's of MHz range, made possible by the low time-delay feedback circuit.

A. System Design

A.1. Design Motivation

In the work of Bajaj et al., two cascaded analog multipliers were used to generate a signal proportional to the cube of the output of the linear resonator. This was then scaled and fed back into the operational amplifier responsible for providing the excitation to the crystal resonator. As discussed in that work, while a digital implementation (analogto-digital conversion, application of the nonlinear function in the digital domain, and then digital-to-analog conversion) would have been prudent from the perspective of design flexibility, the time delay imparted by the sample-and-hold process made an analog implementation more practical even in the 10's of kHz operational frequency range.

The particular ICs used in Bajaj et al. were unsuitable for use with resonators operating in the MHz range due to the limitations in bandwidth (the AD633 has a specified bandwidth of 1 MHz, and the OPA192 operational amplifiers have a specified gain-bandwidth product of 10 MHz, so a gain of 5 would reduce the effective bandwidth to 2 MHz). Unfortunately, while a number of other multiplier ICs were available in the market at the time of the design of the system, they would impart a time delay between the input and output that would limit their applicability for use in such a feedback circuit. While the manufacturer documents cite useful operating frequencies up to 2 GHz and higher in some cases, this is for frequency mixing, modulation, and other applications that do not employ feedback in the same manner as in the desired nonlinear feedback circuit. For example, a DC to 2 GHz "bandwidth" analog multiplier produced by Analog Devices at the time was the ADL5931. As characterized by the datasheet, for a 20 MHz sinusoidal input, the device imparts a phase of approximately 10°, equivalent to a time delay of 1.4 ns. This would have to be cascaded to generate a cubic response (adding another 1.4 ns) and passed through addition amplifiers to deal with DC offset-related issues and scaling, imparting further time delay. As discussed with regards to FIG. 1, this sum does not allow more than approximately 1 ns of delay margin in the design.

Figure 2:
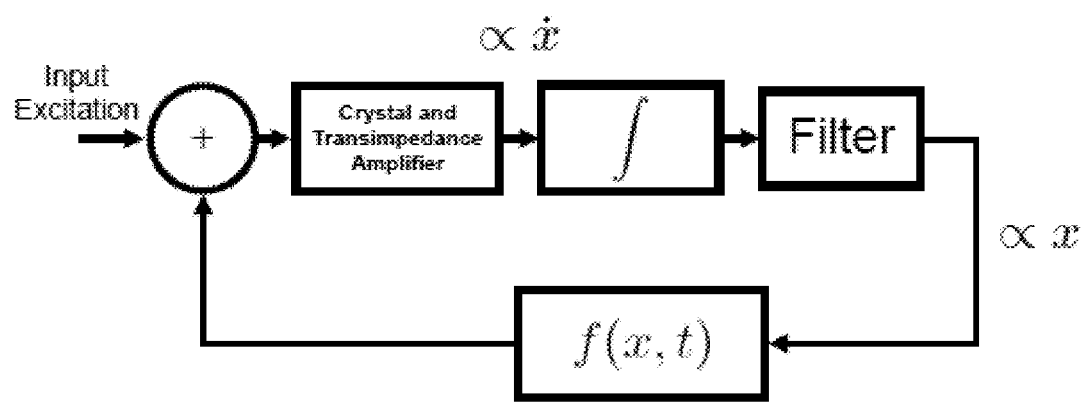
FIG. 2 shows the main elements of a nonlinear feedback system applied to a transimpedance amplifier and crystal resonator combination. In a mechanical resonator analogy, the state x is analogous to displacement, while x represents its time derivative, analogous to velocity.

The pursued alternative approach was to approximate the response of the cubic-feedback system, taking care to keep the salient part of the response, which, from the sensing perspective, is the saddle-node bifurcation in the resonance region. The cubic feedback could be approximated by using a number of possible functions-symmetric squaring or exponentiation circuits could be used to create an approximation. Any appropriate nonlinear function f(x; t) could be placed in the feedback path of the previous design, as shown in FIG. 2. Another simple option would be to produce a piecewise-linear approximation to the cubic function. Conceptually, this could be built with many piecewise sections that approximate the desired cubic function to an arbitrary degree of accuracy. Practically, a saddle-node bifurcation of the type desired is present in the behavior of piecewise-linear resonators with two and three piecewise sections. The ideal current-voltage response of diodes lends itself well to approximating a piecewise function.

A.2. System Description

Figure 3:
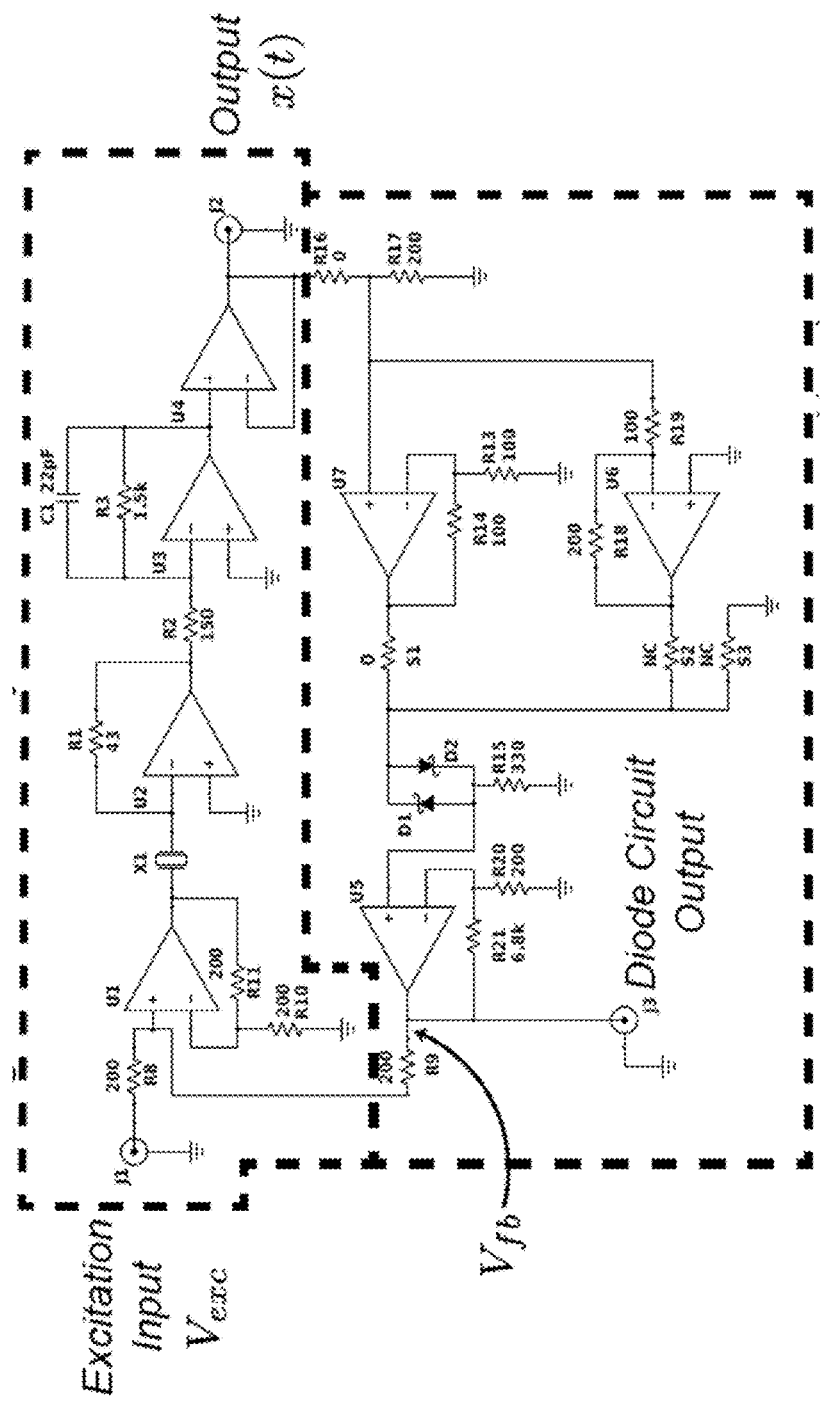
FIG. 3 shows the circuit design for the entire piecewise-linear feedback resonator system. X1 denotes the crystal resonator. Decoupling capacitors and power supply connections are omitted for clarity of the functional elements.
Figure 4:
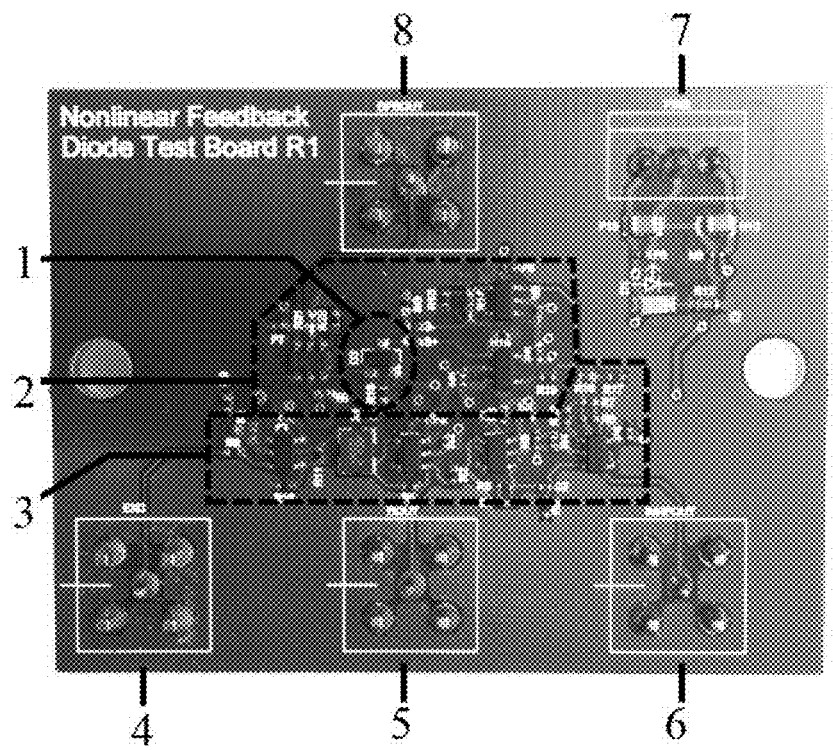
FIG. 4 shows the physical realization of the circuit design on a printed circuit board.

The circuit schematic for the combined resonator and feedback system is shown in FIG. 3 and the physical realization is shown in FIG. 4. In FIG. 4, the element 1 represents a BAT1504 and a resistor. Element 2 represents the piecewise-linear feedback subsystem. Element 3 represents the sensing and actuation subsystem. Element 4 represents the excitation input. Element 5 represents the transimpedance output. Element 6 represents the post-integrator output. Element 7 represents the power input. Element 8 represents the post-diode output. The description follows, beginning with the sensing and actuation subsystem, followed by the low-pass filter gain stage and the diode feedback subsystem. Decoupling capacitors, a power connector, a power indicator LED, and associated current limiting resistors are left off of the schematic for the sake of brevity, as they are not part of the functional design. For decoupling, a single 1 µF capacitor is used to decouple each of the supply voltages (+5V, −5V) close to the power connector, and a local decoupling capacitor of value 10 nF is used for each power supply input of each operational amplifier, placed as close to the integrated circuit pins as possible (within 2 mm in this design).

A.3. Sensing and Actuation Subsystem

The sensing and actuation subsystem has two parts: a non-inverting summing amplifier that drives the crystal resonator with the sum of the feedback and the input excitation, and a transimpedance amplifier that senses the current passing through the crystal. The summing amplifier is implemented with the operational amplifier labeled as U1 (Texas Instruments LMH6609) and resistors labeled as R8, R9, R10, and R11. The crystal, denoted as X1, is directly driven from the summing amplifier output, which is in series with a transimpedance amplifier circuit implemented with the integrated circuit operational amplifier U2 (Texas Instruments OPA847) with the feedback resistor, denoted by R1. For the summing amplifier, the input-output relationship is:

$$V_c = \left(\frac{R_{11}}{R_{10}} + 1\right)\left(\frac{R_8}{R_8 + R_9} V_{fb} + \frac{R_9}{R_8 + R_9} V_{exc}\right) = G_{exc} V_{exc} + G_{2b} V_{fb}, \quad (1)$$

wherein $V_{fb}$ and $V_{exc}$ are the respective feedback and input excitation voltages (in Volts) and the values R8, R9, R10, and R11 are the resistance values in Ohms of the respective resistors. The two substitute terms Gexc and Gab represent effective gains on each term and can be written:

$$G_{exc} = \left(\frac{R_{11}}{R_{10}} + 1\right)\left(\frac{R_9}{R_8 + R_9}\right) \quad (2)$$

$$G_{2b} = \left(\frac{R_{11}}{R_{10}} + 1\right)\left(\frac{R_8}{R_8 + R_9}\right) \quad (3)$$

The transimpedance amplifier has an output voltage $V_t = -R_1 i_c$, where $i_c$ is the current through the crystal, and $R_1$ is the resistance of the feedback resistor in Ohms (Ω). A common model for a quartz crystal resonator is the Butterworth-Van Dyke (BVD) model, which is an electrical model composed of two parallel branches. The motional branch represents the piezoelectric behavior (it represents mechanically-coupled behavior and has a series resistance, capacitance, and inductance). The shunt branch contains a single capacitive element and represents the device capacitance. The BVD model (and extensions of it) is often used for tuning forks and also plate-like resonators, such as quartz crystal microbalances, which are similar to those used in this work. For this (low-fidelity) model, the crystal is represented as the motional branch alone, with the effective values being $L_c$, $R_c$, and $C_c$, with units of Henrys (H), Ohms (Ω), and Farads (F), respectively. Using Kirchoff's Current and Voltage Laws the relationship between the transimpedance amplifier voltage and the summing amplifier output can be derived to be:

$$\frac{V_t}{V_c} = H_{TI}(s) = \frac{-R_f C_c s}{L_c C_c s^2 + R_c C_c s + 1} \quad (4)$$

The Laplace domain description is equivalent to the second order differential equation:

$$-R_f C_c \dot{V}_c = L_c C_c \ddot{V}_t + R C \dot{V}_t + V_t, \quad (5)$$

The resonator response, as sensed through the transimpedance amplifier, yields an output voltage proportional to current, which could be integrated in order to create an output proportional to the accumulated charge and therefore (due to the piezoelectric nature of the quartz crystal) proportional to the displacement. This collocated self-sensing and actuation is an important benefit of using a piezoelectric resonator. Implementation of an ideal (or close to ideal) integrator at a frequency of 16 MHz yields an attenuation of −160 dB in addition to the (desired) phase shift of 90°. In practice, such a large attenuation would push the signal out of the integration stage well below the noise floor of the circuit. A gain comparable in magnitude to this attenuation and considerable filtering would be required to bring the signal to a useful amplitude. Instead the effect of the integrator is approximated by a simple low-pass filter, which can provide the desired phase shift with manageable attenuation.

A.4. Low-Pass Filter Gain Stage

The low-pass filter was implemented by using components U3 (LMH6609), $R_2$, $R_3$, and $C_1$, and is a standard operational amplifier configuration. It has an ideal transfer function expressed as:

$$\frac{V_{o,LP}(s)}{V_{i,LP}(s)} = H_{LP}(s) = \frac{R_3}{R_2}\frac{1}{R_3 C_2 s + 1} \tag{6}$$

This is equivalent to the simple first-order differential equation:

$$R_2(R_3 C_2 \dot{V}_{o,LP} + V_{o,LP}) = R_3 V_{i,LP} \tag{7}$$

Here, s is the Laplace variable, and $R_2$, $R_3$ and $C_1$ are the corresponding resistance or capacitance values of the respective components [Ohms (Ω) and Farads (F)]. $V_{i,LP}$ and $V_{o,LP}$ are the input and output of the low-pass filter stage, respectively. The voltage $V_{o,LP}$ is passed through another operational amplifier (U4) in the physical realization of the circuit. U4 is connected with placements to allow for an optional additional filtering stage (high-pass, low-pass, all-pass, etc.) but is used as a unity gain buffer by placing 0Ω jumper resistors and leaving one placement unpopulated. The buffer passes $V_{o,LP}$ nominally unchanged to the diode feedback subsystem responsible for generating $V_{exc}$. Note that this model of the low-pass filter adds an additional degree of freedom to the overall system model (namely, the filter state).

A.5. Diode Feedback Subsystem

Figure 5:
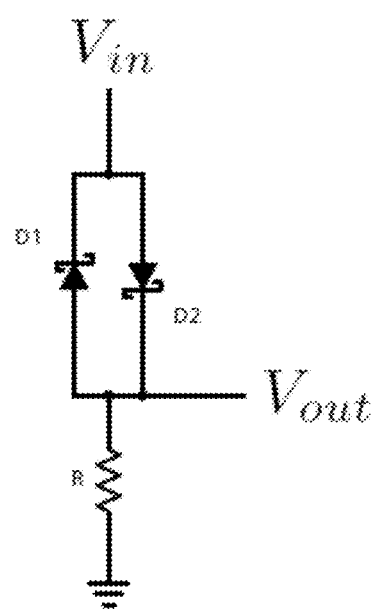
FIG. 5 shows a parallel reversed RF Schottky diode and resistor combination used for generating a piecewise-linear approximation circuit.

The diodes used to generate the approximation to the piecewise-linear response are two series silicon Schottky diodes (manufactured by Infineon) in a single SOT323 package (type BAT15-04W). On the system design schematic in FIG. 3, the two diodes are denoted by D1 and D2, and are in series with a resistor, R15. The functional core of the diode circuit is shown in isolation in FIG. 5. With an ideal diode model and the diode threshold voltage denoted $V_{th}$, the static mapping for such a circuit should be:

$$V_{out} = \begin{cases} V_{in} - V_{th} & V_{in} \geq V_{th} \\ 0 & |V_{in}| < V_{th} \\ V_{in} + V_{th} & V_{in} \leq V_{th} \end{cases} \tag{8}$$

Figure 6:
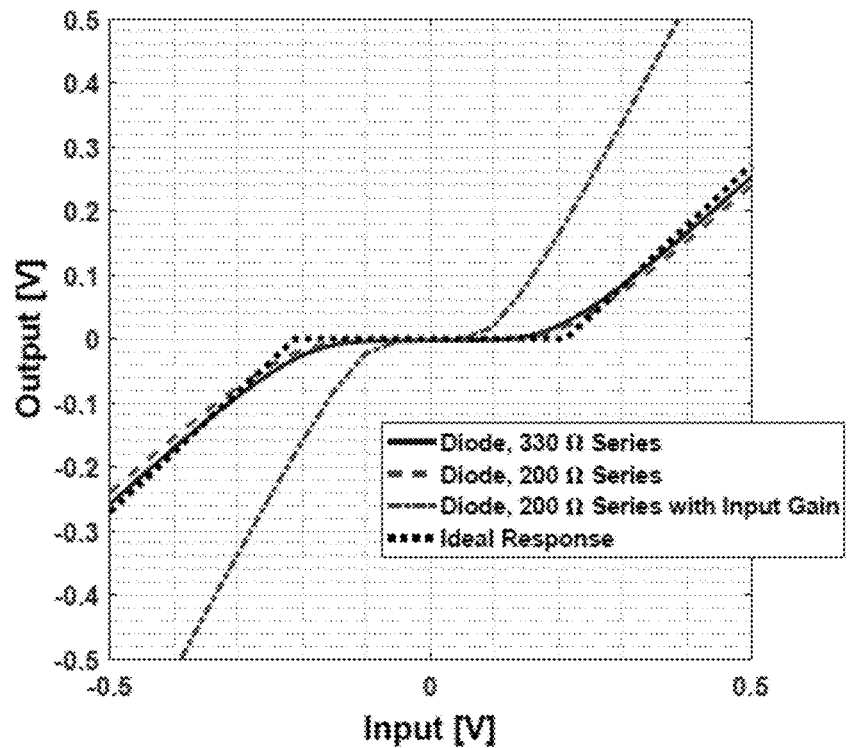
FIG. 6 shows experimental static calibration data for the parallel reversed Schottky diode pair and resistor combination using a BAT15-04W diode pair, with a change to the input gain and series resistor. The series resistor has little influence on the responses as compared to the input gain.

The static calibration for the diode pair and series resistor is shown in FIG. 6, with the effect of modifying the input gain by a factor of two also included. In addition, an "ideal" response is plotted for comparison. The physical device has a smooth transition from essentially zero voltage to the linear (saturated) region, while the piecewise-linear approximation has a discontinuity in the slope at an effective $V_{th}$. The approximation is poorest in a neighborhood around $V_{th}$ and $-V_{th}$. The diode sub-circuit is incorporated into the overall system with an input gain $G_1$ implemented with the operational amplifiers U6 and U7 and resistors R13, R14, R18 and R19, and an output gain $G_{2a}$ implemented with operational amplifier U5 and resistors R21 and R20. The feedback configuration is selected by choosing which position (S−, S+, or SG) to populate with a 0Ω resistor. Depending on the choice, $G_1 = 1 + R_{14}/R_{13}$, $G_1 = -R_{18}/R_{19}$, or $G_1 = 0$, which respectively correspond to the softening, hardening, and linear response cases. Ideally, when the softening selection resistor is in place, the feedback will leave the effective stiffness of the resonator unchanged at low output amplitudes, but reduce the effective stiffness when the amplitude increases beyond $G_1 V_{th}$. Likewise, the hardening case increases the effective stiffness when the output amplitude increases beyond $G_1 V_{th}$. The $G_1 = 0$ case leads to zeroing of the feedback term. $G_{2n} = 1 + R_{21}/R_{20}$. U5, U6, and U7 are LMH6609 operational amplifiers.

Bifurcation-based circuits are known to be sensitive to noise, which can cause the system to jump between stable operating conditions. In order to reduce the likelihood of false-positive detection events in sensor applications, it is important to follow best practices for the grounding and shielding of signals as well as follow good signal layout practice and use low-noise signal sources and power supplies.

B. Preliminary Analytical Model

A preliminary analytical model was formulated by combining the previously discussed sub-circuit idealized models. The method of averaging was then used to develop an analytical solution for the steady-state behavior of the resonator system.

B.1. Problem Formulation

The combination of Equations (5) and (7) along with the nonlinear diode feedback [Equation (8)] results in a 2nd-order system nominally of the form:

$$\ddot{x} + b\dot{x} + k(x) = F \sin(\omega t), \tag{9}$$

where $$k(x) = \begin{cases} k_1 x_c + k_2(x - x_c) & x \geq x_c \\ k_1 |x| & |x| < x_c \\ -k_1 x_c + k_2(x + x_c) & x \leq -x_c \end{cases} \tag{10}$$

Figure 7:
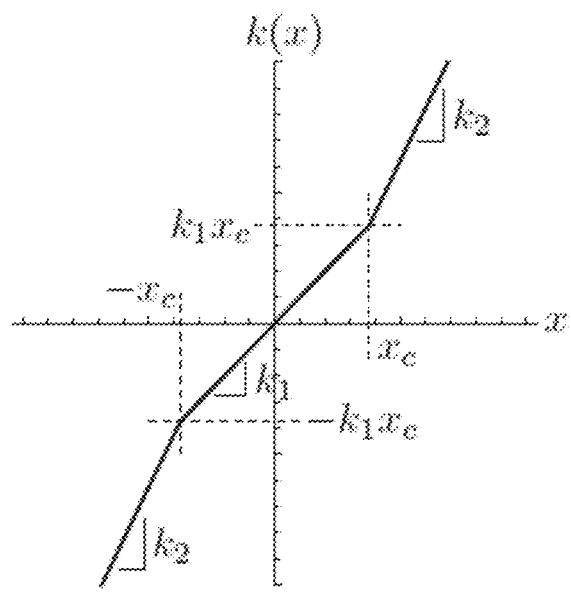
FIG. 7 shows idealized piecewise-linear stiffness model from the dual-diode feedback circuit.
Figure 8A:
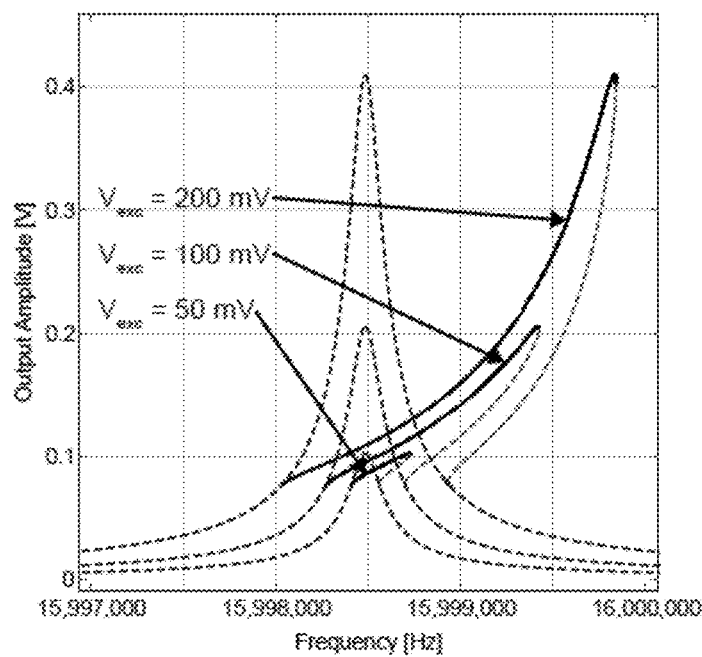
FIG. 8A and FIG. 8B show the hardening-mode response (FIG. 8A) magnitude and (FIG. 8B) phase plots from the averaging model for increasing excitation input amplitude $V_{exc}$.
Figure 8B:
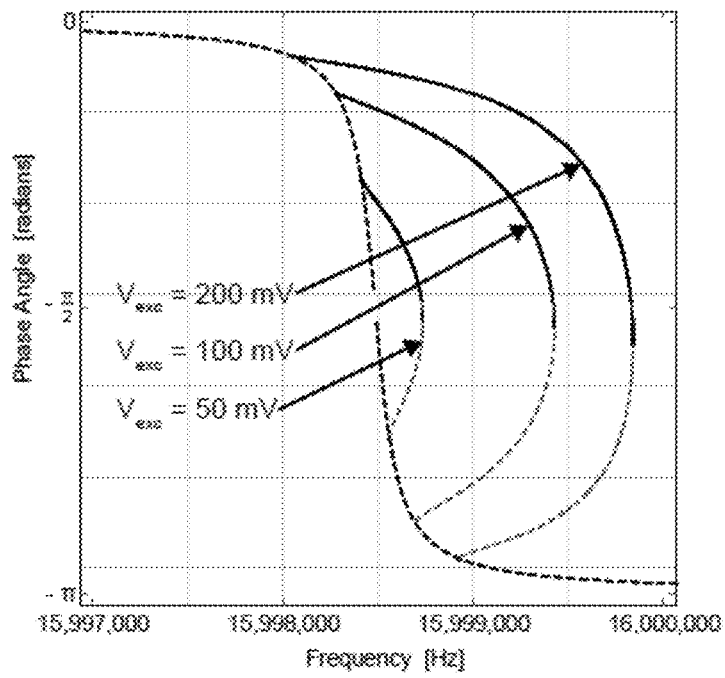
Figure 9A:
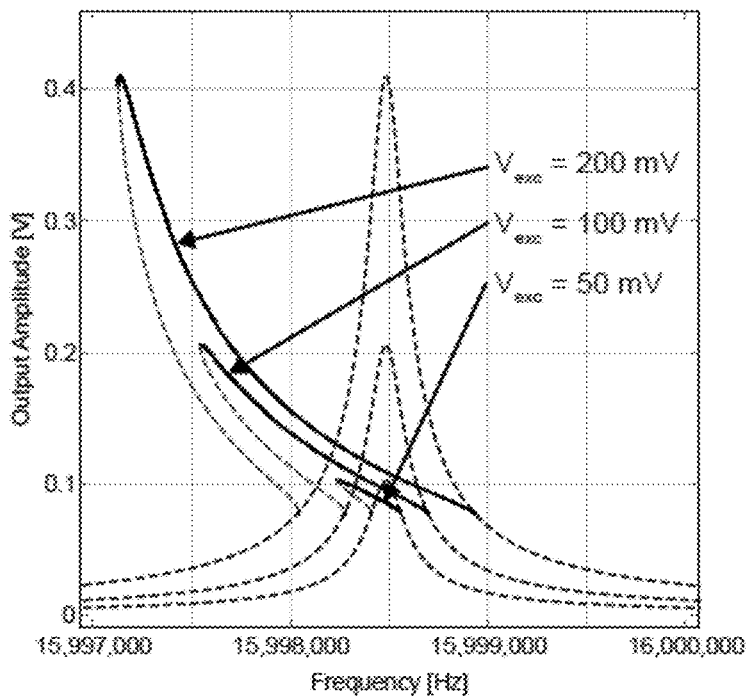
FIG. 9A and FIG. 9B show the softening-mode response (FIG. 9A) magnitude and (FIG. 9B) phase plots from the averaging model for increasing excitation input amplitude $V_{exc}$.
Figure 9B:
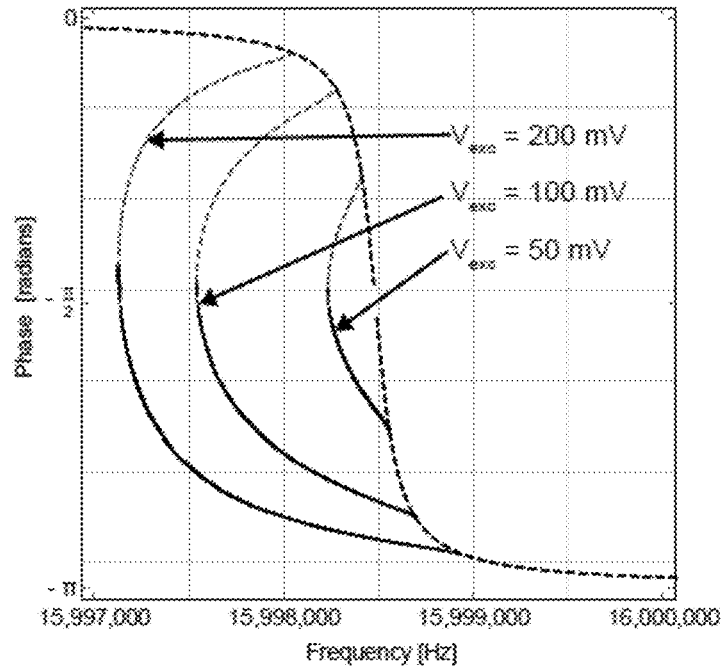
Figure 10A:
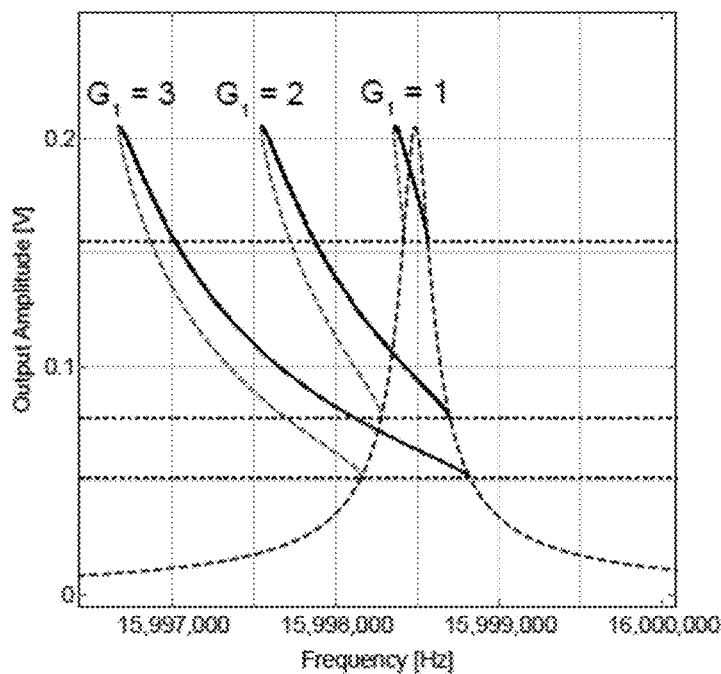
FIG. 10A and FIG. 10B show the softening-mode response (FIG. 10A) magnitude and (FIG. 10B) phase plots from the averaging model for varying $G_1$. Horizontal lines correspond to $V_{th}/G_1$.
Figure 10B:
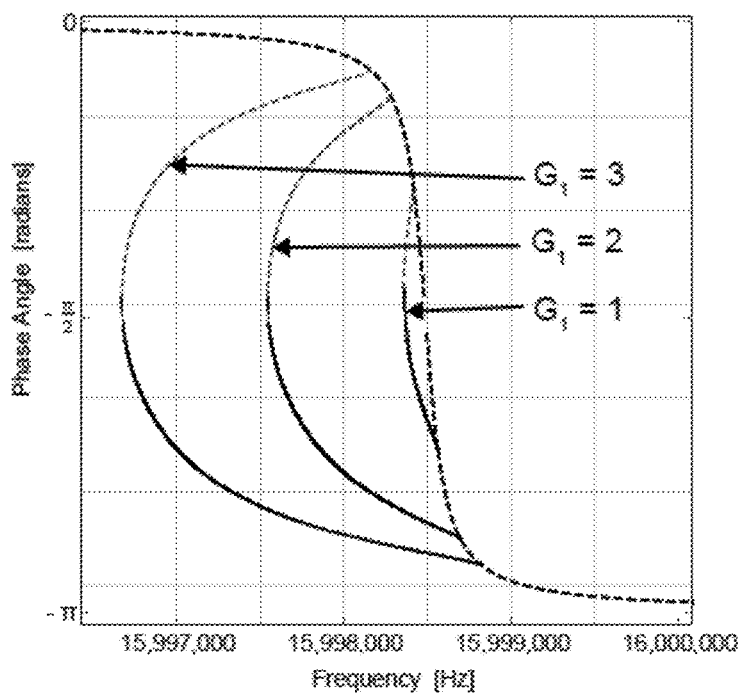
Figure 11A:
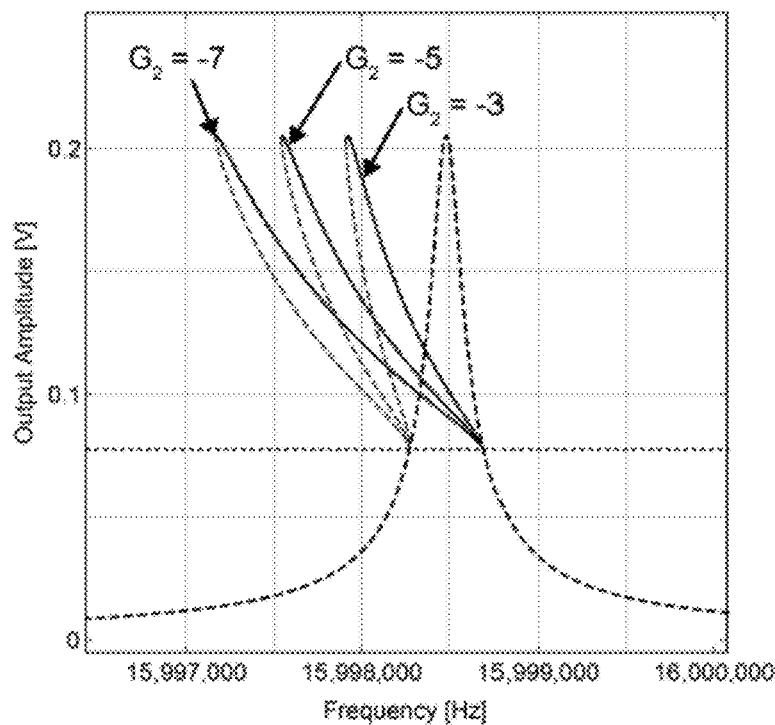
FIG. 11A and FIG. 11B show the softening-mode response (FIG. 11A) magnitude and (FIG. 11B) phase plots from the averaging model for varying $G_2$. Horizontal lines correspond to $V_{th}/G_1$.
Figure 11B:
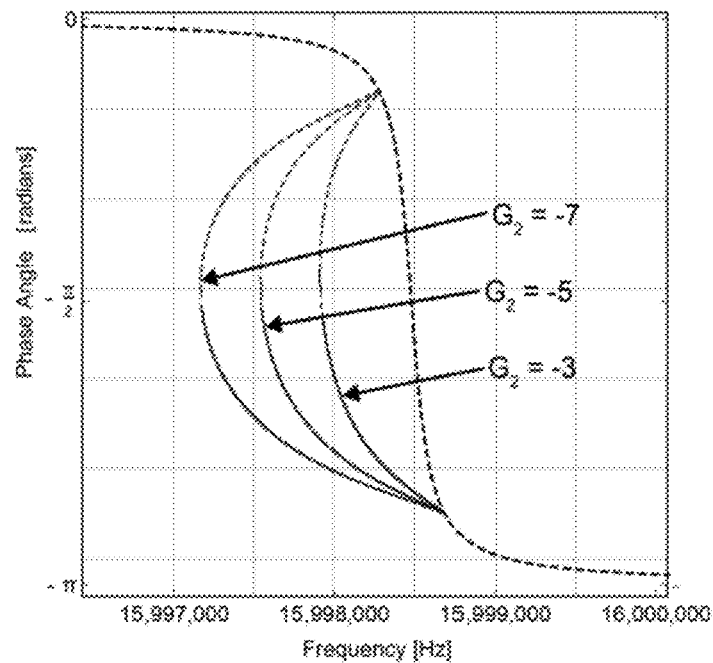

The piecewise-linear restoring force, k(x) of this "stiffness" model can be visualized as in FIG. 7. The stiffness values $k_1$ and $k_2$, the state x, and the threshold value $x_c$ are related to the system parameters from the design section. The diode voltage function slope contributes to $k_2$, but the value of $k_1$ is solely dependent on the linear resonator stiffness. In addition to the piecewise-linear assumption for the stiffness term, the assumption is made that the feedback is instantaneous, and there is no time delay present.

B.2. Solution by the Method of Averaging

The method of averaging can be used to solve for the steady-state behavior of the system. In addition to the assumption of slow time scale parameter variation (if parameters are changing, they do so on time scales far separated from those of the system dynamics) there are a number of other assumptions made in the solution process. First, the system is assumed to have a solution of the form:

$$x(t) = a(t)\sin \varphi(t), \tag{11}$$

where $\varphi(t) = \omega t + \beta(t)$. Here, a(t) and β(t) are the slowly varying amplitude and phase, respectively, of a sinusoidal function. The nonlinearity is assumed to be relatively small, and additional frequency components that may be present in the true solution are assumed to be insignificant. In addition, the constrained coordinate transform, $$\dot{x} = a(t)\omega \cos \varphi(t), \tag{12}$$

is imposed on the solution as well. Differentiating Equation (11) and substituting, yields $\dot{x} = \dot{a}\sin\varphi + a(\dot{\varphi} + \dot{\beta})\cos\varphi$. Combining this with the constrained coordinate transform yields the equation:

$$\dot{a}\sin\varphi + a\dot{\beta}\cos\varphi = 0. \tag{13}$$

The second derivative with respect to time of the solution can be computed as well, as $$\ddot{x} = \frac{d}{dt}[a\omega\cos\varphi] = \omega\dot{a}\cos\varphi - a\omega\dot{\beta}\sin\varphi - a\omega^2\sin\varphi. \tag{14}$$

This can be substituted into the equation of motion, so that $$\underbrace{\omega\dot{a}\cos\varphi - a\omega\dot{\beta}\sin\varphi - a\omega^2\sin\varphi}_{\ddot{x}} + \underbrace{b a\omega\cos\varphi}_{\dot{x}} + k(x) = \tag{15}$$

$$F\sin(\omega t) = F\sin(\varphi - \beta).$$

Equations (13) and (15) can be solved simultaneously to yield the pair of equations:

$$a\omega\dot{\beta} = \sin\varphi[k(x) + ab\cos\varphi - F\sin(\varphi - \beta) - a\omega^2\sin\varphi] \tag{16}$$

$$\omega\dot{a} = -\cos\varphi[k(x) + ab\omega\cos\varphi - F\sin(\varphi - \beta) - a\omega^2\sin\varphi] \tag{17}$$

These Equations [(16) and (17)] are then averaged over a single period of the solution x(t)=a(t)sin(φ(t)). Because they are averaged over φ, the state x over one period must be mapped to φ so that k(x(φ)) can be substituted in prior to integration. As it is assumed that over one period a(t) and β(t) are constant, φ=sin⁻¹(x/a). In addition, the threshold value $\varphi_0 = \sin^{-1}(x_c/a)$. The piecewise regions of k(x(φ)) then can be defined in terms of $\varphi_0$, written as:

$$k(x(\varphi)) = \begin{cases} ak_1\sin\varphi, & 0 \le \varphi \le \varphi_0, \\ k_1 x_c + k_2(a\sin\varphi - x_c), & \varphi_0 \le \varphi < \pi - \varphi_0, \\ ak_1\sin\varphi, & \pi - \varphi_0 \le \varphi < \pi + \varphi_0, \\ -k_1 x_c + k_2(x_c + a\sin\varphi), & \pi + \varphi_0 \le \varphi < 2\pi - \varphi_0, \\ ak_1\sin\varphi, & 2\pi - \varphi_0 \le \varphi < 2\pi. \end{cases} \tag{18}$$

These cases correspond to positions along a single period of φ where the piecewise linear behavior becomes active or inactive. As the solution starts at $x(\varphi)|_{\varphi=0}=0$, the system has linear stiffness. Once the solution crosses the $x_c$ threshold at $\varphi=\pi-\varphi_0$, the $k_2$ stiffness begins to act, until the solution returns back through the threshold at $\varphi=\pi+\varphi_0$, where the stiffness switches back to $k_1$, until the solution value decreases past $-x_c$, and so on. In the case of low excitation amplitude (so that the solution never switches stiffness) a standard linear differential solution method (Laplace Transform) can be used to determine the solution magnitude and phase.

After substituting Equation (18) into Equations (17) and (16), performing the piecewise integration over 0≤φ<2π, dividing by 2π, and simplifying, $$\dot{a} = -\frac{1}{2}\left[\frac{ab\omega + F\sin\beta}{\omega}\right], \tag{19}$$

$$\dot{\beta} = -\left(\frac{a\pi(k_2 - \omega^2) + 2(k_2 - k_1)x_c\sqrt{1 - \frac{x_c^2}{a^2}} + }{2\pi a\omega}\right) \tag{20}$$

$$\frac{2a(k_1 - k_2)\sin^{-1}\left(\frac{x_c}{a}\right) - F\pi\cos\beta}{2\pi a\omega}$$

Letting $\dot{a} = \dot{\beta} = 0$ and solving yield, $$\sin\beta = \frac{-ab\omega}{F}, \tag{21}$$

$$\cos\beta = \frac{a\pi(k_2 - \omega^2) + 2(k_1 - k_2)x_c\sqrt{1 - \frac{x_c^2}{a^2}} + 2a(k_1 - k_2)\sin^{-1}\left(\frac{x_c}{a}\right)}{F\pi}. \tag{22}$$

Combining these two equations provides the implicit relationship between ω and a, $$\frac{a^2 b^2 \omega^2}{F^2} + \frac{\left(a\pi(k_2 - \omega^2) + 2(k_1 - k_2)x_c\sqrt{1 - \frac{x_c^2}{a^2}} + 2a(k_1 - k_2)\sin^{-1}\left(\frac{x_c}{a}\right)\right)^2}{F^2\pi^2} - 1 = 0 \tag{23}$$

For a given set of parameters, once the values of a are computed, the corresponding values of β can be computed as $$\beta = -\cos^{-1}\left(\frac{a\pi(k_2 - \omega^2) + 2(k_1 - k_2)x_c\sqrt{1 - \frac{x_c^2}{a^2}} + 2a(k_2 - k_1)\sin^{-1}\left(\frac{x_c}{a}\right)}{F\pi}\right) \tag{24}$$

B.3. Stability

The stability of the derived steady-state solutions can be evaluated by examining the eigenvalues of the slowly time varying differential equations for $\dot{a}$ and $\dot{\beta}$, Equations (16) and (17). By evaluating the Jacobian matrix, $$J = \begin{bmatrix} \frac{\partial \dot{a}}{\partial a} & \frac{\partial \dot{a}}{\partial \beta} \\ \frac{\partial \dot{\beta}}{\partial a} & \frac{\partial \dot{\beta}}{\partial \beta} \end{bmatrix} = \begin{bmatrix} -\frac{b}{2} & -\frac{F\cos\beta}{2\omega} \\ \frac{4(k_2 - k_1)x_c\sqrt{1 - \frac{x_c^2}{a^2}} + F\pi\cos\beta}{2\pi a^2 \omega} & \frac{F\sin\beta}{2a\omega} \end{bmatrix} \tag{25}$$

the trace (Tr) and determinant (Det) of J can be calculated $$Tr(J) = \frac{1}{2}\left(\frac{F\sin\beta}{a\omega} - b\right) \quad (26)$$

$$Det(J) = \frac{4F(k_2 - k_1)x_c\sqrt{1 - \frac{x_c^2}{a^2}}\cos\beta + F^2\pi\cos^2\beta - abF\pi\omega\sin\beta}{24\pi a^2\omega^2} \quad (27)$$

Points along the solution are those that satisfy Equations (23) and (24), and the stability of those points can be determined by evaluating the trace and determinant for those values of a and β. If Tr(J)<0, and Det(J)>0, then the corresponding steady-state solution is stable.

B.4. Mapping of Parameters

The derived solution presented above is dependent on parameters $k_1$, $k_2$, F, $x_c$, b, and ω. The parameters $k_1$, $k_2$, F, $x_c$, and b are derived as equivalent expressions from the circuit design.

First, the resonator and low-pass filter model need to be considered. Because the frequency range over which the system is excited is a small region around the natural frequency of the resonator, well above the cut-off frequency of the low-pass filter, the behavior of the low-pass filter stage can be modeled as a gain. For example, for the implemented parameters, $R_3$=1.5 kΩ, $R_2$=150Ω, and $C_2$=22 pF. With these component values, over the frequency range 15.99 MHz to 16.01 MHz, the magnitude IHLP (s)$I_s$=jω takes values from 2.863 to 2.860, a deviation of only 0.1%. The change in the imparted phase is also correspondingly small. As such, the assumption is that the low-pass filter imparts an effective static gain $G_e$ that is the amplitude difference between what the low-pass filter yields, divided by what an integrator would yield. This is calculated as:

$$G_e(j2\pi f) = \left|\frac{H_{LP}(s)}{\frac{1}{s}}\right|_{s=j\omega=j2\pi f} = |sH_{LP}(s)|_{s=j\omega=j2\pi f} \quad (28)$$

For the aforementioned parameters, $G_e$=2.88×10$^8$ [V/V]. The corresponding imparted phase angle is −73.4 degrees, which allows a phase "budget" for the rest of the feedback system of 16.6 degrees, equivalent to a time delay "budget" of 2.881 ns. This could be tuned to allow for phase delay due to other components such as amplifiers and parasitic effects.

Assigning the state variable x to be $V_{o,LP}$ allows for the coefficients of the equation of motion to be related to the effective gain $G_e$ and the crystal behavioral parameters, along with the transimpedance resistor value R1. It can be derived from the circuit model that $x_c=V_{th}/G_1$. Similarly, $k_1=1/(L_cC_c)$. When feedback is included and scaled, $k_2=k_1+G_eG_1G_2R_1/L$. The forcing input is similarly scaled, as $F=V_{exc}R_1G_e/L$. The linear damping of the circuit model can be written $b=R_c/L_c$.

Table 1 details the parameter values used in the model. The crystal parameters and $R_1$ were estimated by assuming nominal values for the low-pass filter stage components (and deriving a corresponding $G_e$), and approximately fitting the linear response of the crystal (no feedback). Other resistances and gains were taking to be nominal values. The resistances listed in the table as "varies" or "varied" were those that were replaced between subsequent gain trials, in order to arrive at the $G_1$ and $G_2$ values used in those experiments. The corresponding resistor values were between 0≠ and 10Ω. The maximum gains are limited by the gain-bandwidth product (GBW) of the operational amplifiers in the circuit. FIGS. 8A, 8B, 9A and 9B show the magnitude and phase of the frequency response of the analytical model with $G_1$=2, $G_2$=±5, and an input excitation amplitudes $V_{exc}$ of 50 mV, 100 mV, and 200 mV. FIGS. 10A, 10B, 11A and 11B show the effect of varying $G_1$ and $G_2$ respectively (while the other diode gain is held constant). By varying the gains (selected via resistor values) the position of the two bifurcation frequencies can be varied, as well as the distance (in Hz) between them. The amplitude can be varied in the tuning process as well. It is also observed that manipulation of $G_1$ and $G_2$ does not appear to significantly affect the response peak amplitude. This is due to the relative scaling of constants specific to this application due to the high frequency and low damping of the resonator. The quantity $G_eG_1G_2R_1/L$ is four orders of magnitude smaller than $k_1$.

TABLE 1

The nominal values used in the simulation and analytical work for the circuit elements are presented. It is important to emphasize that these are nominal values - some measured directly from circuit components, but not derived from a thorough system identification procedure. The number of significant figures in $L_c$ and $R_c$ values were used to tune the analytical linear frequency response and experimental stepped sine sweeps to match.

| Parameter(s) | Value | Units | Description |
|---|---|---|---|
| $R_1$ | 43 | Ω | Transimpedance feedback resistance |
| $R_c$ | 60 | Ω | Crystal motional resistance |
| $L_c$ | 0.055 | H | Crystal motional inductance |
| $C_c$ | 1.78 | fF | Crystal motional capacitance |
| $R_2$ | 1.5 | kΩ | Low-pass filter feedback resistance |
| $C_1$ | 22 | pF | Low-pass filter feedback capacitance |
| $R_3$ | 150 | Ω | Low-pass filter input resistance |
| $G_e$ | 2.88 × 10$^8$ | V/V | Low-pass effective gain (vs. integrator) |
| $G_1$ | varies | V/V | Diode circuit input gain (1 + R14/R13 or R18/R19) |
| $V_{th}$ | 0.155 | V | Diode forward voltage |
| $G_2$ | Varies | V/V | Diode circuit output gain (1 + R21/R20) |
| $R_8$, $R_9$, $R_{10}$, $R_{11}$ | 200 | Ω | Drive and summing amplifier circuit resistances |
| $R_{13}$, $R_{14}$, $R_{19}$ | varies | Ω | Diode input gain amplifier resistances for G1 |
| $R_{18}$ | varies | Ω | Diode input gain amplifier resistances for G1 |
| $R_{15}$ | 300 | Ω | "Voltage division" resistance for diode circuit |
| $R_{20}$ | 200 | Ω | Gain setting resistance for G2 |
| $R_{21}$ | varies | kΩ | Gain setting resistance for G2 |

C. Experimental Results

The experimental setup consisted of a linear power supply (Agilent E3631A) supplying ±5V and common connections to the circuit connector, as seen in FIG. 4. The excitation input was connected to an output channel of a Zurich Instruments HF2LI Lock-in Amplifier, and the post-integrator (after the low pass stage) output was connected to the input of the lock-in amplifier. Increasing and decreasing frequency sweeps were performed, at varying amplitudes of input excitation.

The behavior of the system was initially characterized with zero feedback. The SG resistor was set to 0Ω by soldering a standard 0Ω resistor in place, and the S+ and S− resistors were left unpopulated. This allowed the nominal linear response of the system to be characterized, from the summing amplifier input to the output labeled "post-integrator" output in FIG. 4. This signal is the output of the sensing and actuation subsystem, and allowed estimation of the system quality factor and resonant frequency.

In the subsequent experiments, the behavior in the various operating modes (linear, hardening, softening) was characterized by observing steady-state responses to sinusoidal excitation over a range of frequencies near resonance. The sweep consisted of a 30 kHz range, with 100 Hz stepping between discrete input frequencies, beginning with 15,997 kHz. This coarse frequency resolution allowed confirmation that the resonant frequency was in the range of excitation prior to completing a more finely spaced stepped sine test, over a 3 kHz range at 10 Hz increments. The applied demodulation filter (integrated in the lock-in amplifier system) had a bandwidth of $f_{BW,LF}$=22.51 Hz (linear filter of order 4) which allowed low noise measurement of the magnitude and phase response of the system. Using the terminology used in the Zurich Instruments software, 30 "time constants" were allowed to elapse to allow settling time between measurements, where a "time constant" $T_{LF}$=1/$f_{BW,L1}$. A total of 16 measurements per input frequency were averaged, resulting in an overall dwell time at each input frequency of (16)(30)/(22.51)=21.3 seconds. At each setting of the parameters (gains, input excitation amplitude) one increasing frequency and one subsequent decreasing frequency stepped sine test were conducted.

Figure 12A:
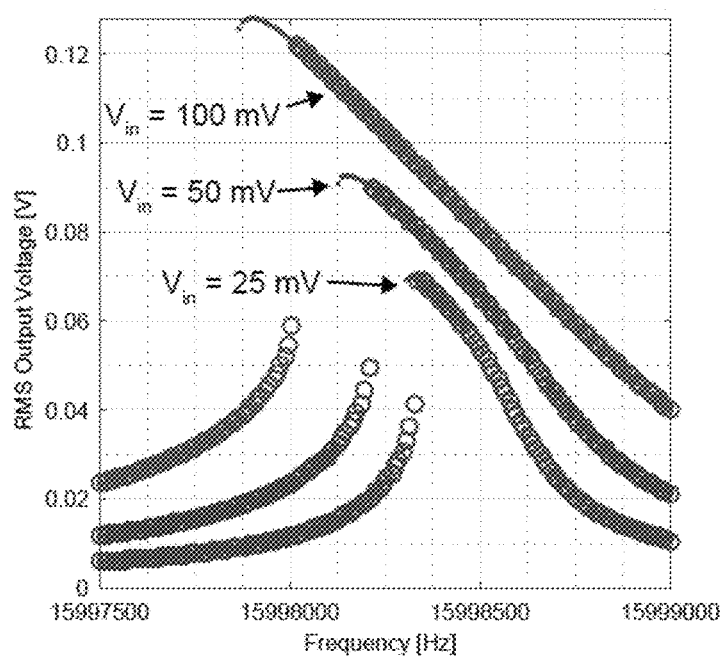
FIG. 12A and FIG. 12B show the experimental (FIG. 12A) magnitude and (FIG. 12B) phase stepped frequency sine test results from the dual-diode feedback circuit for increasing excitation input voltage amplitude, for $G_1=1.999$ and $G_2=5.096$. Open circles denote increasing frequency stepped sine test, and small filled circles denote results for decreasing frequency test.
Figure 12B:
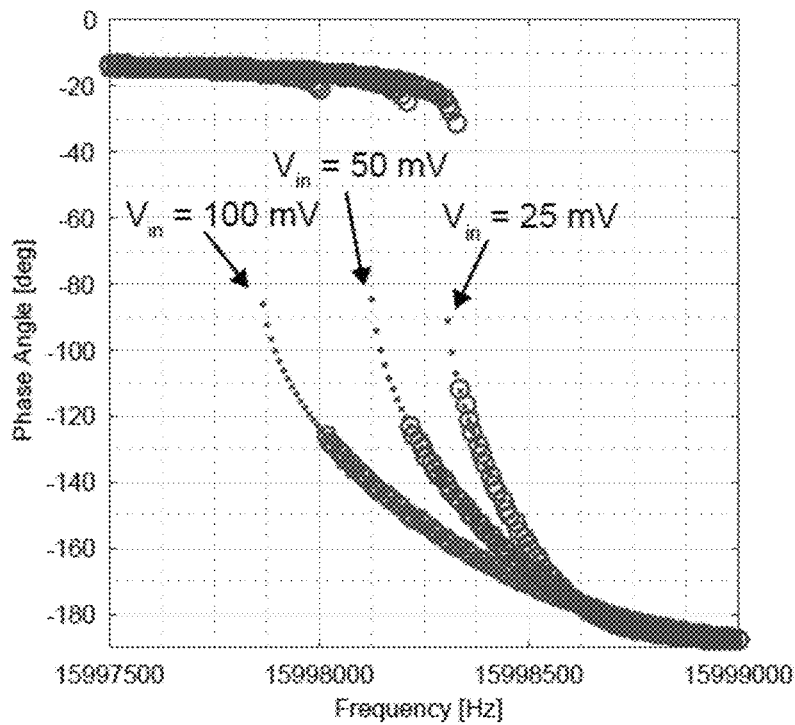

In FIG. 12A and FIG. 12B, experimental results are shown for an experiment in which three stepped sine tests were performed with constant gains $G_1$ and $G_2$ and varying the input amplitude. As the input amplitude is increased, the overall amplitude of response at all of the examined frequencies increases as well. In addition, the nonlinear characteristics also appear to increase, in the sense that the deviation from a linear response increases and the "hysteresis" phenomenon (the difference between bifurcation frequencies on increasing and decreasing frequency sweeps) also increases, with both of these trends in qualitative agreement with the literature.

Figure 13A:
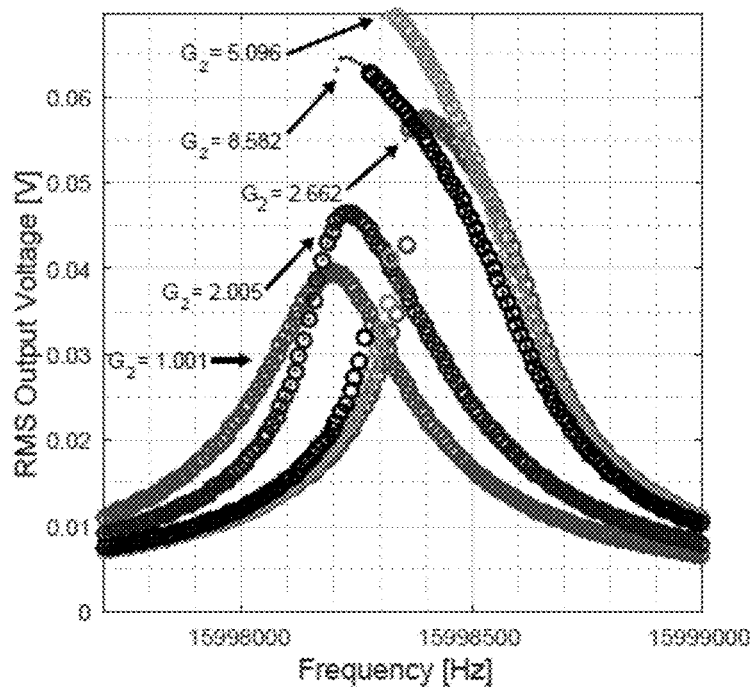
FIG. 13A and FIG. 13B show the experimental results from the dual-diode feedback circuit for increasing post-diode gain $G_2$, with excitation voltage $V_{exc}=50$ mV and $G_1=1.999$.
Figure 13B:
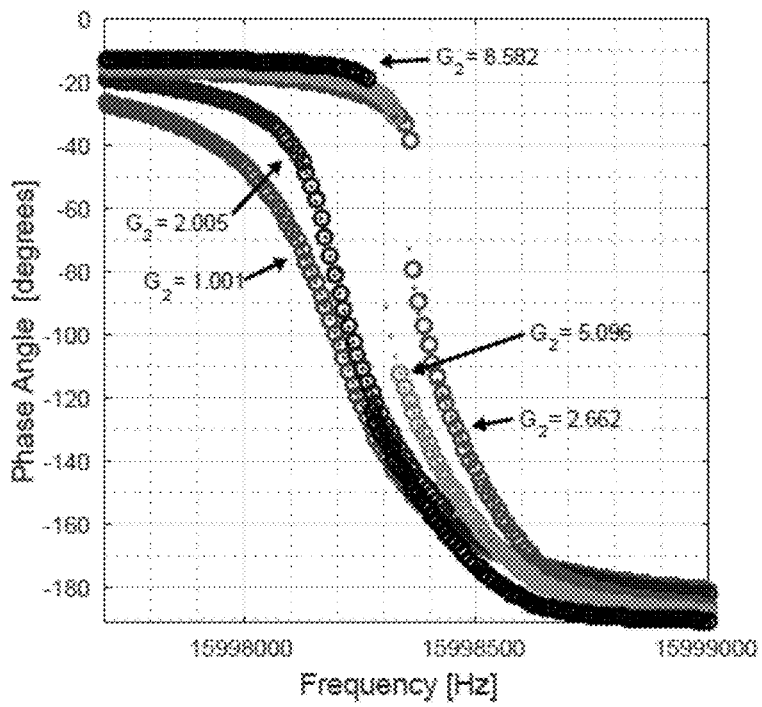

In FIG. 13A and FIG. 13B, the effect of increasing $G_2$ can be seen. For the $G_2$=1.001 and $G_2$=2.005 cases, the system shows behavior deviating from a linear response, but the bifurcation is not present. At $G_2$=2.682 and above, the bifurcation is evident, and the difference between bifurcation frequencies increases as $G_2$ increases. There are some changes in the amplitude in these cases that the ideal piecewise-linear model does not predict.

D. Comparison: Analytical Model, Numerical Simulation, and Experiments

Figure 14A:
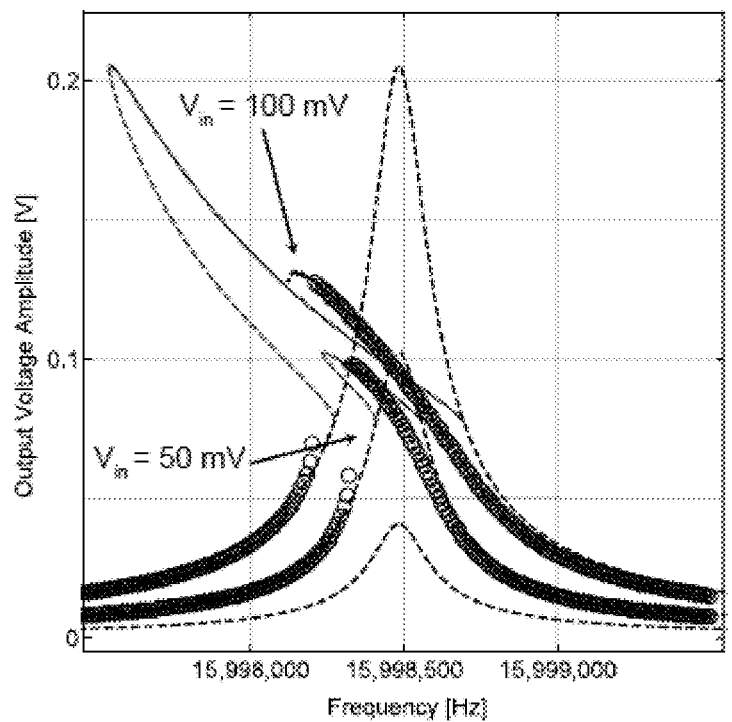
FIG. 14A and FIG. 14B show the softening-mode response (FIG. 14A) magnitude and (FIG. 14B) phase plots for increasing excitation input amplitude, comparing experimental and analytical responses. Open circles denote increasing frequency stepped sine test, and small filled circles denote results for decreasing frequency test.
Figure 14B:
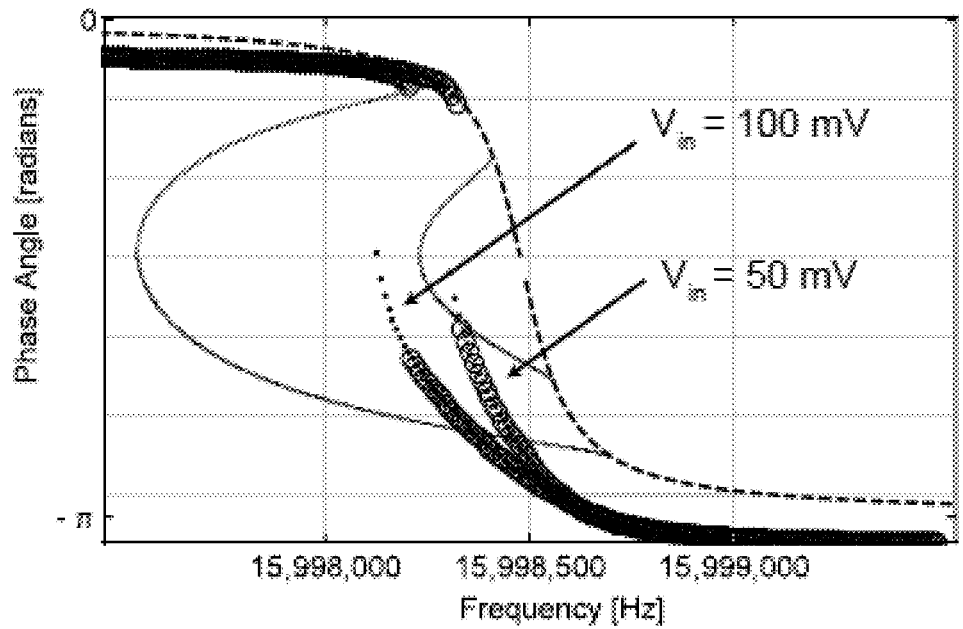

The model, as described above, is a preliminary one, and demonstrates that the basic behavior can be qualitatively captured through a traditional modeling approach. A comparison of the experimental and analytical results can be seen in FIG. 14A and FIG. 14B. FIG. 14A and FIG. 14B show the magnitude and phase responses at the same nominal parameters.

A number of factors are hypothesized to contribute to the modeling error and addressing them may improve both qualitative (shape) and quantitative performance at the expense of additional modeling complexity. One factor contributing to the mismatch may be the difference between the ideal and measured diode deadband curve (as the real system does not exhibit such a sharp piece wise linear transition at $V_{th}$). In addition, the time delay that is potentially present in the system is not modeled in the analytical derivation. Electronic noise (also present in the circuit) has been shown in other work to cause the bifurcations to occur at different points from where the theory would predict (typically at a lower frequency for an increasing frequency sweep, and a higher frequency for a decreasing frequency sweep). Also, there may be some contribution from parametric identification uncertainty. In addition, structural modeling simplifications (i.e., not including parasitic capacitance, resistance, or inductance explicitly in the model) may also be a factor. In particular, quartz resonators are often modeled with a Butterworth-Van Dyke (BVD) model or an extended-BVD model, which have an additional shunt capacitance in parallel with the $L_c$, $R_c$, and $C_c$ of the resonator. Such parasitic components can have a significant impact on the predicted system response but it can be challenging to identify these quantities. The modeling assumption that eliminated the state from the low-pass filter could also be contributing to the modeling error.

A circuit was proposed and demonstrated to produce saddle-node bifurcation behavior in a frequency region around 16 MHz by using a diode-based piecewise linear feedback architecture. This approach was adopted in order to minimize the effect of time delay, which was more prevalent in prior cubic feedback-based architectures involving the use of ADC and DAC, or cascaded analog multipliers. A model was constructed incorporating the ideal piecewise-linear feedback of the design. The responses of the model show qualitative agreement with experimental results. However, the quantitative mismatch between the model and experimental results indicates the need for further analysis for this class of system. Namely, systematic incorporation of time delay, parasitic loading, and the non-ideal nature of the diode static response curve into models will be important next steps in better predicting the response of these devices.

Nonlinear Mode Sensing

In order to validate the idea of nonlinear mode sensing, a circuit board was designed that replicated two of the diode feedback circuits with CX3225 resonators, and also included a temperature and humidity sensor. The two devices on the board were decapped and then one of the two devices was functionalized. The functionalization process was performed via micropipette, depositing a 0.05 mg/mL solution of TIPS-pentacene dissolved in toluene. The micropipette was used to dispense 2 µL at a time onto the resonator, and the liquid was constrained during drying to the "box" formed by the ceramic package around the resonator. This was repeated 5 times to develop a film layer in order to achieve a similar frequency shift to prior functionalization efforts that led to successful linear mode sensing. While prior to functionalization the device demonstrated bifurcation behavior with 100 mV excitation, once the functionalization was applied, this behavior was dampened out. It was then necessary to drive the device at higher input amplitude in order to guarantee the bifurcation behavior. Prior to each sensing trial, the sensing chamber was cleaned with ethanol and isopropanol wipes. The sensor was installed, and characterization performed to determine the bifurcation frequencies for the two resonators. Then, the trial began, with the input frequency set at an offset from the upper jump frequency (for the softening mode, and referred to as the "standoff distance"). This offset varied by trial. The device was continuously exposed to a nitrogen purging stream, and at a certain point in the trial the devices were exposed to a stream of nitrogen gas passing through the heated chamber containing TNT flakes. Both the purging stream and the TNT-laden stream of nitrogen gas were controlled via the mass flow controllers, set to 5 ccm, in order to attempt to reduce flow-related uncertainties.

The standoff frequency "distance" for each test is shown in Table 2, and also contains results on whether the individual sensors triggered or not post-exposure.

TABLE 2

Standoff frequency values for the functionalized resonator $X_1$ and the unfunctionalized resonator, $X_2$, and the triggering results for five TNT sensing trials.

| Trial | $X_1$ standoff | $X_2$ standoff | $X_1$ triggered | $X_4$ triggered |
|---|---|---|---|---|
| 1 | 6 Hz | 8 Hz | Yes | No |
| 2 | 15.1 Hz | 15.5 Hz | Yes | No |
| 3 | 10.0 Hz | 10.0 Hz | Yes | Yes |
| 4 | 10.0 Hz | 10.0 Hz | Yes | No |
| 5 | 15.0 Hz | 15.0 Hz | No | No |

In all of the cases that the functionalized sensor triggered, the uncoated resonator either did not trigger or triggered significantly later than the functionalized sensor. Therefore, the bifurcation-based sensing methodology built on the feedback-enabled nonlinear resonators showed promise in the nonlinear detection of vapors.

In one embodiment, the present disclosure provides a piecewise-linear resonator system, wherein the piecewise-linear resonator system comprises at least one pair of parallel reversed diodes and at least one resistor or a device that has resistor function as a diode feedback subsystem, wherein the piecewise-linear resonator system is capable of generating a saddle-like bifurcation behavior with a frequency of at least 1 MHz.

In one embodiment, the present disclosure provides that the piecewise-linear resonator system is capable of generating a saddle-node-like bifurcation behavior with a frequency of about 1-100 MHz, 1-75 MHz, 1-50 MHz, or 1-25 MHz.

In one embodiment, the present disclosure provides that said at least one pair of parallel reversed diodes and said at least one resistor are in series configuration in said diode feedback subsystem. In one aspect, the resistor may be any device that has resistor function.

In one embodiment, the present disclosure provides a sensing device comprising:

a linear response sensor comprising a functional surface layer capable of interacting with a material to be sensed, and an output capable of producing a linear signal according to the material that is sensed by the linear response sensor;

a sensing and actuation subsystem comprising a non-inverting summing amplifier, a transimpedance amplifier, and a resonator with a resonant frequency of at least 1 MHz, wherein the sensing and actuation subsystem has an input coupled to the output of the linear response sensor, wherein the input is configured to receive the linear signal produced by the linear response sensor; and a diode feedback subsystem comprising at least one pair of parallel reversed diodes and at least one resistor or a device that has resistor function, wherein the diode feedback subsystem is capable of generating a piecewise-linear approximation circuit, wherein the sensing device is capable of generating saddle-node-like bifurcation behavior with a frequency of at least 1 MHz.

In one embodiment, the present disclosure provides that the diode feedback subsystem of the sensing device further comprises at least one resistor or a device that has resistor function, wherein said at least one pair of parallel reversed diodes and said at least one resistor are in series configuration.

In one embodiment, the present disclosure provides a sensing device, wherein the sensing device comprises:

a linear response sensor comprising a functional surface layer located to interact with a material to be sensed, and an output that produces a first linear signal responsive to one or more of mass, inertia, stiffness, acceleration, pressure, radiation, chemical compounds, or biological compounds; and a system comprising an input coupled to said output of the linear response sensor to receive said first linear signal produced from said output; and a non-linearity feedback subsystem that applies one or more non-linear electrical operations to said first linear signal received at said input from said output to generate a non-linear second signal, wherein said one or more non-linear electrical operations are capable of generating bifurcation in the non-linear second signal when said one or more non-linear electrical operations are applied to the first linear signal received at said input, wherein said non-linearity feedback subsystem comprises one pair of parallel reversed diodes and one resistor as a diode feedback subsystem.

Those skilled in the art will recognize that numerous modifications can be made to the specific implementations described above. The implementations should not be limited to the particular limitations described. Other implementations may be possible.

We claim:

1. A sensing device comprising:
   a linear response sensor comprising a functional surface layer capable of interacting with a material to be sensed, and an output capable of producing a linear signal according to the material that is sensed by the linear response sensor;
   a sensing and actuation subsystem comprising a non-inverting summing amplifier, a transimpedance amplifier, and a resonator with a resonant frequency of at least 1 MHz, wherein the sensing and actuation subsystem has an input coupled to the output of the linear response sensor, wherein the input is configured to receive the linear signal produced by the linear response sensor; and
   a diode feedback subsystem comprising at least one pair of parallel reversed diodes and at least one resistor or a device that has resistor function, wherein the diode feedback subsystem is capable of generating a piecewise-linear approximation circuit,
   wherein said sensing device is capable of generating saddle-node-like bifurcation behavior with a frequency of at least 1 MHz.

2. The sensing device of claim 1, wherein said at least one pair of parallel reversed diodes and said at least one resistor are in series configuration in said diode feedback subsystem.

3. A piecewise-linear resonator system, wherein the piecewise-linear resonator system comprises at least one pair of parallel reversed diodes and at least one resistor or a device that has resistor function as a diode feedback subsystem, wherein the piecewise-linear resonator system is capable of generating a saddle-node-like bifurcation behavior with a frequency of at least 1 MHz.

4. The piecewise-linear resonator system of claim 3, wherein said at least one pair of parallel reversed diodes and said at least one resistor or a device that has resistor function are in series configuration in said diode feedback subsystem.

* * * * *